United States Patent [19]

Sönmez et al.

[11] Patent Number: 5,745,872
[45] Date of Patent: Apr. 28, 1998

[54] METHOD AND SYSTEM FOR COMPENSATING SPEECH SIGNALS USING VECTOR QUANTIZATION CODEBOOK ADAPTATION

[75] Inventors: Mustafa Kemal Sönmez, Silver Springs, Md.; Periagaram K. Rajasekaran, Richardson, Tex.

[73] Assignee: Texas Instruments Incorporated, Dallas, Tex.

[21] Appl. No.: 646,192

[22] Filed: May 7, 1996

[51] Int. Cl.$^6$ .................................. G10L 3/02; G10L 9/00
[52] U.S. Cl. .................................................. 704/222; 704/231
[58] Field of Search ........................... 395/2.3, 2.31, 395/2.35, 2.36, 2.37, 2.4, 2.42, 2.52, 2.53, 2.65

[56] References Cited

U.S. PATENT DOCUMENTS

| | | | |
|---|---|---|---|
| 5,046,099 | 9/1991 | Nishimura | 395/2.31 |
| 5,148,489 | 9/1992 | Errel et al. | 395/2.35 |
| 5,487,129 | 1/1996 | Paiss et al. | 395/2.31 |
| 5,598,505 | 1/1997 | Austin et al. | 395/2.35 |

OTHER PUBLICATIONS

A. Acero, *Acoustical and Environmental Robustness in Automatic Speech Recognition*, Kluwer Academic Publishers, Boston, MA, 1993.

R. Schwartz, et al., "Comparative Experiments on Large Vocabulary Speech Recognition," *Proc. ARPA Human Language Technology Workshop*, Plainsboro, New Jersey, Mar. 1993.

Y. Linde, et al., "An Algorithm for Vector Quantizer Design," IEEE Transaction Communication, vol. COM–28, pp. 84–95, Jan. 1980.

Y. Gong, "Speech Recognition in Noisy Environments: A Survey", *Speech Communication*, 16, 1995, pp. 261–291.

F. H. Liu, et al., "Environment Normalization for Robust Speech Recognition Using Direct Cepstral Comparison," ICASSP–94, pp. 61–6, Apr. 1994.

Liu et al., "Environment Normalization for Robust Speech Recognition using Cepstral Comparison" ICASSP '94, vol. II, pp. II–61–II–64.

Frangoulis et al., "Isolated Word Recognition in Noisy Environment by Vector Quantization of the HMM Noise Distributions" ICASSP '91, pp. 413–416.

Lin et al., "Microphone Arrays and Speaker Identification" IEEE Oct. 1994, vol. 2, pp. 622–629.

Das et al., "Adaption Techniques for Ambience Microphone Compensation in the IBM Tangora Speech Recognition System" ICASSP '94, vol. I, pp. I–21–I–24.

Frangoulis et al., "Adaptation of the HMM Distributions Application to a VQ Codebok and to Noisy Environment"ICASSP '92, vol. 1, pp. I–489–I–492.

Class et al., "Fast Speaker Adaptation Combined with Soft Vector Quantization in a HMM Recognition System", ICASSP '92, vol. 1,pp. I–461–I–463.

*Primary Examiner*—Allen R. MacDonald
*Assistant Examiner*—Patrick N. Edouard
*Attorney, Agent, or Firm*—Robert L. Troike; Tammy L. Williams; Richard L. Donaldson

[57] ABSTRACT

The present invention is a speech processing system and method which includes a codebook generator (26) for generating a reference vector quantization codebook which describes a reference environment and for generating at least one secondary vector quantization codebook which describes at least one secondary environment. The secondary vector quantization codebooks are generated using the reference vector quantization codebook. A speech recognizer (38), which is trained using the reference vector quantization codebook, is also included. A pre-processor (32) accepts as input speech collected from an unknown environment and pre-processes that speech, before input to the speech recognizer (38), using the reference vector quantization codebook and an adaptation of the secondary vector quantization codebooks.

13 Claims, 2 Drawing Sheets

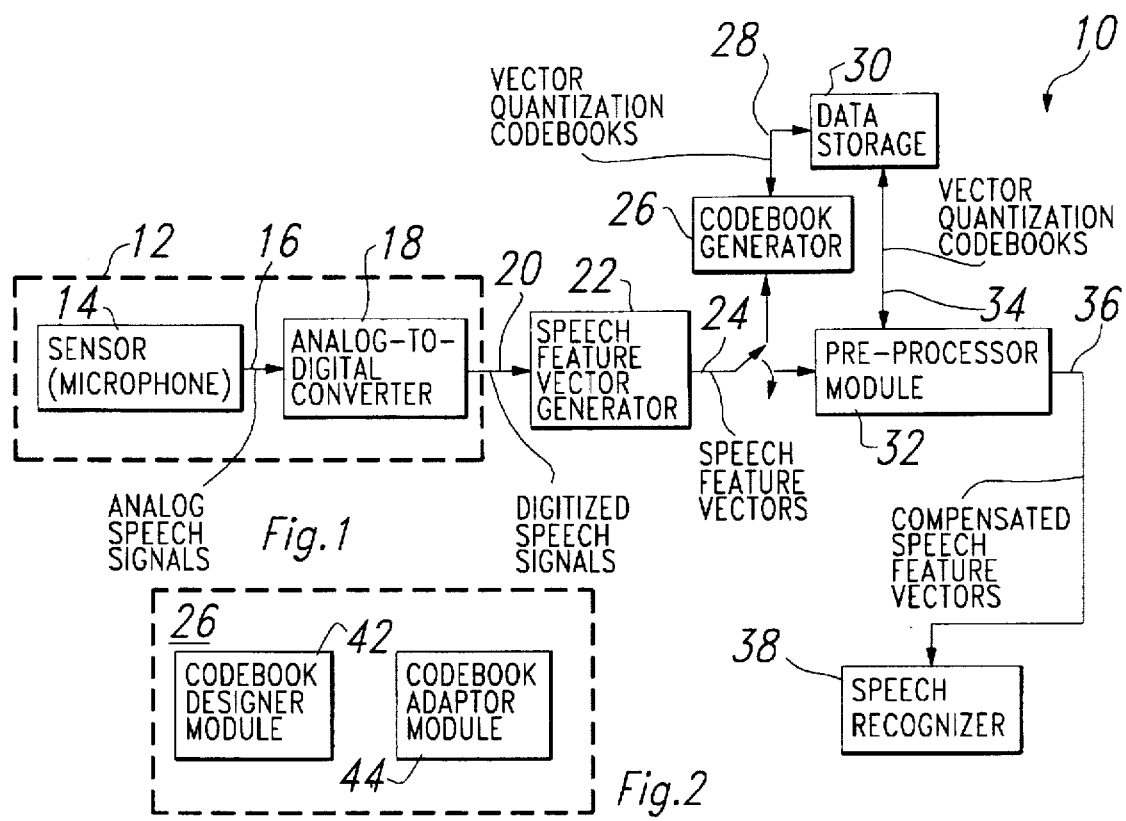
Fig.1
Fig.2
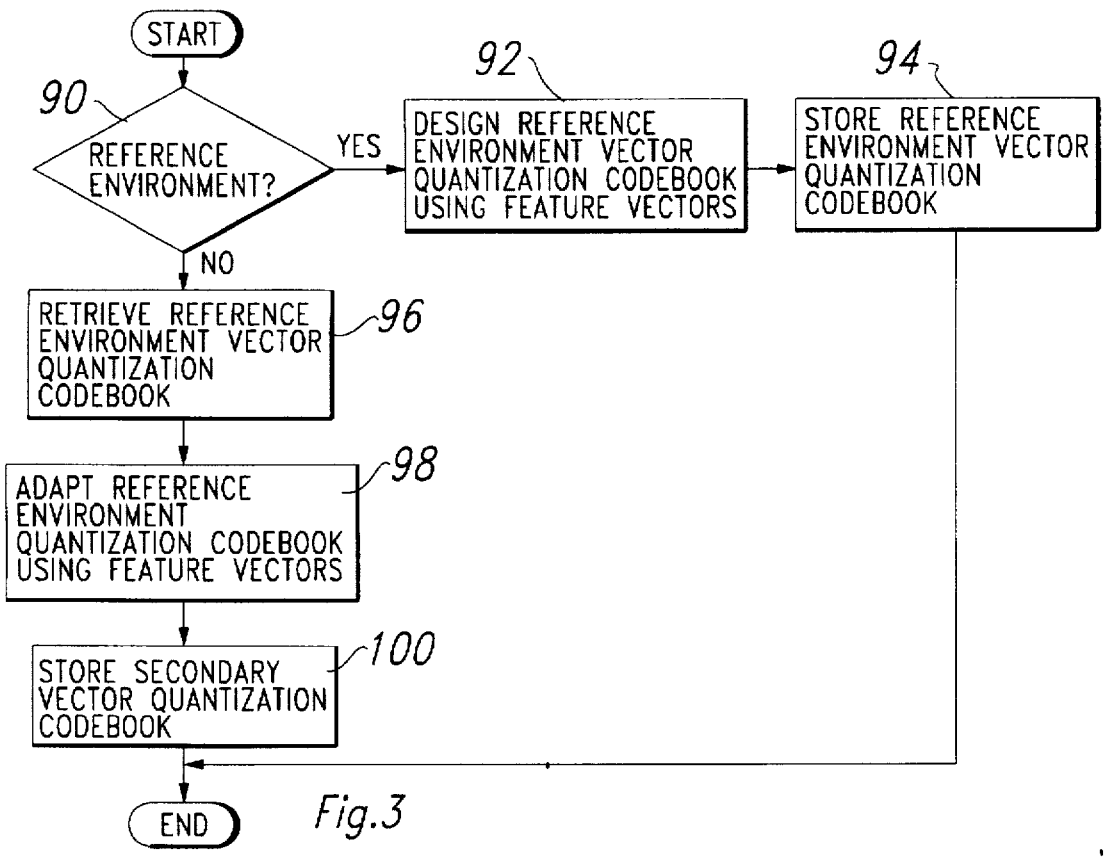
Fig.3

METHOD AND SYSTEM FOR COMPENSATING SPEECH SIGNALS USING VECTOR QUANTIZATION CODEBOOK ADAPTATION

TECHNICAL FIELD OF THE INVENTION

This invention relates to the field of speech processing and more particularly to a method and system for compensating speech signals using vector quantization codebook adaptation.

BACKGROUND OF THE INVENTION

State of the art speech recognizers exhibit a particular sensitivity to mismatches in training and testing environments. This sensitivity degrades performance in many tasks such as command and digit recognition over telephone, and voice dialing. The performance degradation as a result of acoustical environment mismatches between the training and testing environments is one of the most important practical problems in speech recognition. The problem carries a greater significance in applications over telecommunications channels, especially with the wider use of personal communications systems such as cellular phones which invariably present challenging acoustical conditions.

Speech recognition in noisy environments is an important practical problem and has attracted significant amounts of research. There exists a variety of approaches to many versions of the problem summarized in reasonable detail in the article "Speech Recognition in Noisy Environments: A Survey" by Y. Gong in *Speech Communication*, 16, 1995 on pages 261–291. There also exists a class of techniques which use direct comparisons of various environments [see, for example, A Acero, *Acoustical and Environmental Robustness in Automatic Speech Recognition*, Kluwer Academic Publishers, Boston, Mass., 1993 (hereinafter referred to as "Acero"); F. H. Liu, R. H. Stern, A Acero, P. J. Moreno, "Environment Normalization for Robust Speech Recognition Using Direct Cepstral Comparison," *ICASSP-94*, pp. 61–64, April 1994 (hereinafter referred to as "Liu, et al."); and R. Schwartz, T. Anastakos, F. Kubala, J. Makhoul, L. Nguyen, G. Zavaliagkos, "Comparative Experiments on Large Vocabulary Speech Recognition," *Proc. ARPA Human Language Technology Workshop*, Plainsboro, N.J., March 1993 (hereinafter referred to as "Schwartz, et al.")].

The Codeword Dependent Cepstral Normalization (CDCN) technique of Acero of Carnegie-Mellon University (CMU) assumes a Gaussian density for both the reference environment in which the speech models are trained and the unknown test environment. Then it computes both the unknown density parameters and the compensation vectors by an iterative Expectation-Maximization algorithm. This technique is environment independent, i.e. does not require any training data from the test environment, but it is also computationally costly. In most practical applications, especially when real-time response is required, the computational load is prohibitive.

Therefore, the CMU group has introduced the Fixed CDCN (FCDCN), see Liu, et al., which does a similar type of correction for a known test environment for which simultaneously recorded stereo speech data are available. To extend this technique to the case of an unknown test microphone, a Multiple FCDCN (MFCDCN) technique has been proposed. MFCDCN uses a set of known microphones for all of which simultaneously recorded stereo speech data are required for all of the environments. This very important constraint has allowed both techniques to be used only with different types of microphones for which stereo recordings made in a studio environment are available. One can say these techniques are for microphone compensation rather than general environment compensation since it would not be possible to collect simultaneously recorded data for a variety of environments of practical importance, such as cellular phones in moving vehicles, etc.

The codebooks in both prior art approaches discussed hereinabove are fixed throughout the recognition process and, once an environment in the available set of environments is selected, the compensation vectors are not changed.

Thus, what is needed is a compensation technique which both makes use of a priori information about likely acoustical environments and then adapts to the test environment to improve speech recognition.

SUMMARY OF THE INVENTION

The present invention is a speech recognition method and system which includes a codebook generator for computing vector quantization codebooks for a known reference environment and known secondary environments and a preprocessor which compensates speech collected from an unknown environment using the vector quantization codebooks generated for the known environments. The compensated speech is then input to a speech recognizer, which has been trained using the reference vector quantization codebook, for further processing.

An object of the present invention is to avoid the need for simultaneous stereo recording by adapting the reference vector quantization codebook to secondary environments.

Another object of the present invention is to dynamically adapt the available environment codebooks to the test environment to continuously improve the match between environments.

These and other features of the invention that will be apparent to those skilled in the art from the following detailed description of the invention, taken together with the accompanying drawings.

DESCRIPTION OF THE DRAWINGS

FIG. 1 shows a block diagram illustrating the present invention;

FIG. 2 shows a block diagram illustrating a codebook generator in accordance with the present invention;

FIG. 3 is a flow diagram depicting the operation of the codebook generator in accordance with the present invention.

DETAILED DESCRIPTION OF THE INVENTION

Figure 4:
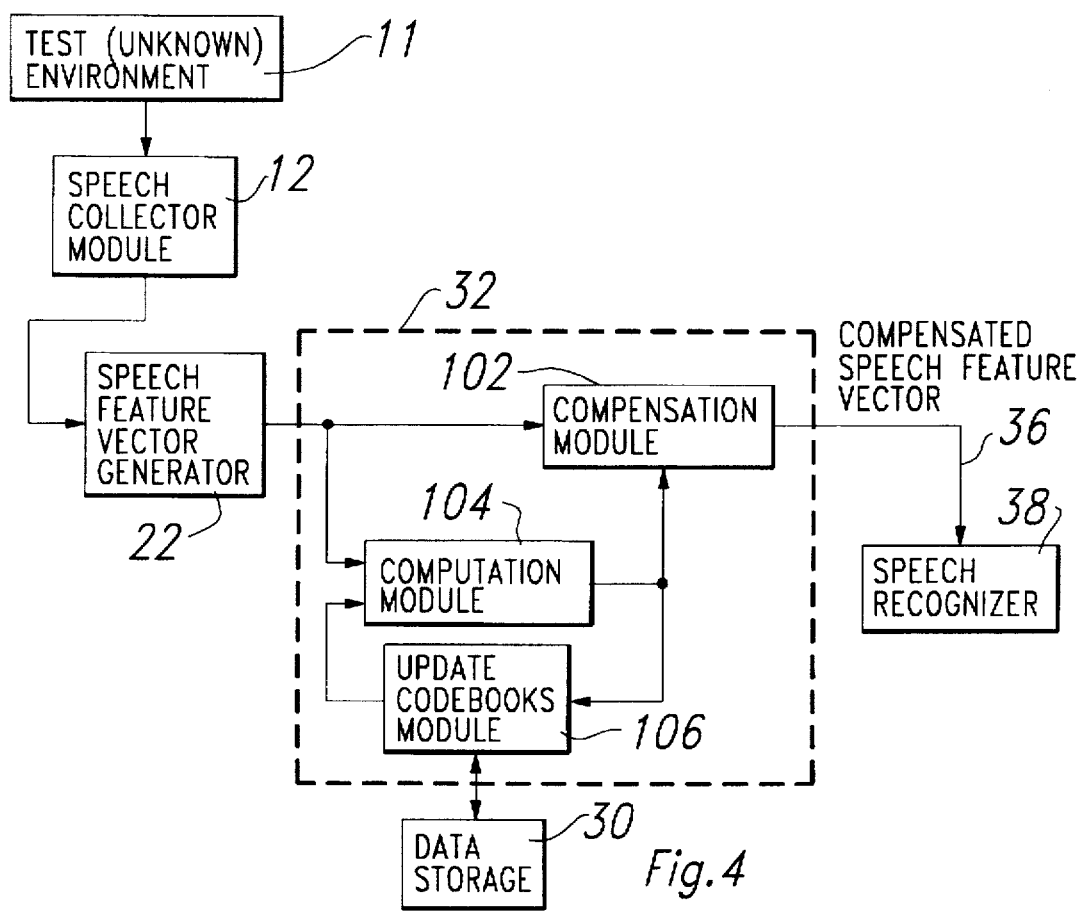
FIG. 4 depicts a block diagram of a pre-processor in accordance with the present invention.

The method and system of the present invention includes a technique which improves speech recognition performance for tasks where the speech input is received from a variety of acoustical environments that are different from the environment from which the speech data that the models are trained on have been obtained. The sensitivity of Hidden Markov Model (HMM) based recognizers to mismatches in training and testing environments is well known. This sensitivity degrades performance in many tasks such as command and digit recognition over telephone, and voice dialing. The technique described in the present invention pre-processes incoming speech feature vectors which transforms the incoming speech vectors so they better fit the model environment using both a priori information about likely acoustical environments and on-line adaptation about the actual testing environment.

For the McCaw cellular corpus, the technique used in the system and method of the present invention decreases the word error for continuous ten digit recognition of cellular corpus. In particular, the technique decreases the word error for continuous ten digit recognition of cellular hands free microphone speech with land line trained models from 23.8% to 13.6% and decreases the speaker dependent voice calling sentence error from 16.5% to 10.6%.

A block diagram illustrating one embodiment of a system in accordance with the present invention is shown in FIG. 1. In the HMM Speech Recognizer 38 used in the present invention, a broad range of features such as frame energy, voicing, spectra and their derivatives are concatenated to form a high dimensional feature vector. Principle component analysis is applied to this high dimensional vector speech to reduce dimensionally by selecting a subset of axes along which statistical variation is maximal. This procedure is performed by the Speech Feature Vector Generator 22 shown in FIG. 1.

The Codebook Generator 26 generates vector quantization codebooks for speech feature vectors in a principle component space, denoted by $\Phi$. Therefore, members in a class are related not only in terms of their spectra, as in many other approaches, but also by both static and dynamic features which determine the way they are affected by the environment in terms of speech recognition performance. The Codebook Generator 26, as shown in FIG. 2, includes a Codebook Designer Module 42 and a Codebook Adaptor Module 44, each of which is discussed in detail hereinbelow.

An acoustical environment, h, is described by a vector quantization codebook, $X^h$, where $X^h=\{\chi_k{}^h \in F, k=1 \ldots K\}$, and where each codevector, $x_k{}^h$, represents a class of feature vectors in the principle component space, $\Phi$.

The vector quantization codebook for the reference environment, $X^{ref}$, where $X^{ref}=\{x_k{}^{ref} \in F, k=1, \ldots, K\}$, is designed in the Codebook Designer Module 42 using the Generalized Lloyd algorithm [see Y. Linde, A. Buzo, R.M. Gray, "An Algorithm for Vector Quantizer Design," IEEE Trans. Commun., vol. COM-28, pp. 84–95, Jan. 1980 (hereinafter referred to as "Linde, et al.")].

In the vector quantization codebooks for the secondary environments, $\chi$, where $\chi=\{X^h, h=1, \ldots H\}$, $x_k{}^{ref}$ and $x_k{}^h$ must correspond to identical acoustical classes. With a simultaneously recorded stereo database, this is automatically satisfied since all the frames are labeled and class confusion does not occur. For applications such as voice dialing over telephone, it is not practically possible to collect a stereo database.

In one implementation of the Codebook Adaptor Module 44 of the present invention, the incremental updates technique presented in Liu, et al. is used to adapt the secondary environment codebooks. It is also contemplated, however, that the Codebook Adaptor Module 44 may be implemented using the Generalized Lloyd algorithm with the codebook for the reference environment used as the initial codebook. The second implementation of the Codebook Generator 26 of the present invention may be regarded as a batch version of the incremental updates technique of the first implementation. Practically, both have provided comparable performances. In the current embodiment of the present invention, the second implementation is used to implement the Codebook Adaptor Module 44.

FIG. 3 is a flow diagram illustrating the operation of the Codebook Generator 26 shown in FIG. 1. If, at decision block 90, incoming speech feature vectors received from the Speech Feature Vector Generator 22 are from the reference environment, then processing continues at block 92 where the speech feature vectors are used to design the reference vector quantization codebook. Then, at block 94, the resulting reference vector quantization codebook is stored in Data Storage 30 and processing in the Codebook Generator 26 ends.

If, at decision block 90, the incoming speech feature vectors represent one of the known secondary environments, then processing continues at block 96 where the reference vector quantization codebook is retrieved from the Data Storage 30. Then, at block 98, the reference vector quantization codebook is adapted using the speech feature vectors from the known secondary environment to generate a secondary vector quantization codebook. At block 100, the secondary vector quantization codebook is stored to the Data Storage 30 and processing in the Codebook Generator 26 terminates.

FIG. 4 shows a block diagram illustrating the Pre-Processor Module 32 in detail. As shown in FIG. 4, the Pre-Processor Module 32 includes a Compensation Module 102, a Computation Module 104 and an Update Codebooks Module 106.

Let the incoming speech feature vector (n-th frame of the utterance) from the unknown test environment be denoted as $x(n)$. Then, the compensated feature vector, $\hat{x}(n)$, shown at 32 in FIGS. 1 and 4, is computed by the Compensation Module 102 in accordance with the equation $$\hat{x}(n) = x(n) + \sum_h Ph \sum_k p_k{}^h(n)[x_k^{ref} - x_k{}^h(n)]$$

where the probability, $p_k{}^h(n)$, that the n-th frame belongs to Voronoi region k in the codebook h is computed by the Computation Module 104 in accordance with the equation $$P_k{}^h(n) = \frac{e^{-\beta(x_k{}^h(n)-x(n))^2}}{\sum_k e^{-\beta(x_k{}^h(n)-x(n))^2}}$$

and the probability, Ph, that the utterance belongs to environment h, is computed by the Computation Module 104 in accordance with the equation $$Ph = \frac{e^{-\alpha \Sigma_n(\hat{x}^h(n)-x(n))^2}}{\sum_h e^{-\alpha \Sigma_n(\hat{x}^h(n)-x(n))^2}}$$

where $$\hat{x}^h(n) = x_{k_0{}^h(n)}{}^h, k_0{}^h(n) = \arg \min_k (x_k{}^h - x(n))^2.$$

During compensation and recognition, performed by the Compensation Module 102 and the Speech Recognizer 38, respectively, on-line adaptation of codebooks is accomplished by the Update Codebooks Module 106 in accordance with the equation $$x_k{}^h(n) = x_k{}^h(n-1) + \mu_k{}^h(n)[x(n) - x_k{}^h(n-1)]$$

where $$\mu_k{}^h(n) = \gamma(n) Ph \, p_k{}^h(n)$$

and where $\gamma(n) \sim 1/n$.

The following experimental results are presented on continuous digit recognition and voice calling in the McCaw Cellular Corpus. The corpus consists of data collected over cellular channels by using two types of microphones: a hand-held, close talking microphone and a hands-free, visor mounted microphone together with land-line collected speech data. The land-line and hand-held microphone parts of the corpus are mostly clean telephone speech comparable in quality to VAA corpus. The hands-free microphone part of the corpus, however, is significantly noisier than the rest.

Two experiments on the speaker independent portion of the McCaw database are described hereinbelow. The first experiment investigates the effectiveness of the compensation algorithm in normalizing the effects brought about by the hands-free microphone when models trained on the hand-held microphone are being used. The second experiment is more general and uses models trained on the VAA corpus in comparing the normalized and unnormalized performances on the complete McCaw continuos digit data.

In the first experiment, models created using VAA models as seeds and updated with the hand-held portion of the McCaw corpus were used. Therefore, the hand-held row of the results table is strictly a closed set result. In the second experiment, finite duration digit models trained on the VAA1 corpus were used.

The corpora involved were normalized by the technique disclosed in this document. The codebook size for which the results are reported here is 16. The codebooks were trained on data sets in the McCaw and VAA corpora disjoint from the model training sets for which the recognition results were obtained.

The results of the first experiment (with models updated with hand held data) are shown hereinbelow in Table 1.

TABLE 1

| environment | no. of files | word error w/o normalization | word error w/ normalization |
| --- | --- | --- | --- |
| hand held | 283 | 3.3 | 3.5 |
| hands free | 246 | 20.1 | 10.2 |

The error in the hand held (reference) environment is almost the same and there is a significant decrease in the hands free error.

The results of the second experiment (with models trained on VAA only) are shown hereinbelow in Table 2.

TABLE 2

| environment | no. of files | word error w/o normalization | word error w/normalization |
| --- | --- | --- | --- |
| vaa2 | 1390 | 4.1 | 4.2 |
| land line | 282 | 4.5 | 4.7 |
| hand held | 283 | 6.0 | 6.1 |
| hands free | 246 | 23.8 | 13.6 |

In Table 2, the reference environment is VAA. The normalization does not disturb the reference environment appreciably nor the land line and hand held environments which are close to the VAA. There is again a significant decrease in the hands free error.

Similar experiments were repeated in the speaker dependent portion of the McCaw database. Tables 3 and 4 hereinbelow summarize the average results for 30 speakers each uttering 10 names in a voice calling application. Table 3 presents the results for the case the land line was used as the reference environment. Table 4 shows the results for the case in which hand-held was the reference environment.

TABLE 3

| environment | no. of files | error w/o normalization | error w/ normalization |
| --- | --- | --- | --- |
| land line | 696 | 3.4 | 3.7 |
| hand held | 688 | 4.7 | 5.4 |
| hands free | 650 | 16.5 | 10.6 |

TABLE 4

| environment | no. of files | error w/o normalization | error w/ normalization |
| --- | --- | --- | --- |
| land line | 696 | 3.7 | 3.5 |
| hand held | 688 | 2.8 | 3.6 |
| hands free | 650 | 7.4 | 6.6 |

It is straightforward to generalize the technique used in the present invention to continuos mixtures instead of vector quantization codebooks, where computations would increase and possibly some improvement would be obtained. The technique used in the present invention is applicable to any problem where parametric treatment of the unwanted distortion is hard and data are available on various likely conditions which cause the distortion.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A speech processing system including:

collector means for collecting speech signals from a plurality of environments, said plurality of environments including a reference environment and at least one secondary environment;

a speech feature vector generator coupled to said collector means for generating speech feature vectors from said collected speech;

a codebook generator operable to be coupled to said speech feature vector generator for using said speech feature vectors to generate a reference vector quantization codebook describing speech collected from said reference environment and to generate at least one secondary vector quantization codebook describing speech collected from said at least one secondary environment;

storage means coupled to said codebook generator for storing said reference vector quantization codebook and said at least one secondary vector quantization codebook;

a pre-processor coupled to said storage means and operable to be coupled to said speech feature vector generator for generating a codebook adaptation using said reference vector quantization codebook and said at least one secondary vector quantization codebook and for using said codebook adaptation to transform speech feature vectors collected from an unknown environment to generate compensated speech feature vectors; and a speech recognizer for processing said compensated speech feature vectors, said speech recognizer including speech models trained using said reference vector quantization codebook.

2. The speech processing system of claim 1 wherein said speech recognizer is a Hidden Markov Model based recognizer.

3. The speech processing system of claim 1 wherein said codebook generator is operable to generate said reference vector quantization codebook using a Generalized Lloyd algorithm.

4. The speech processing system of claim 1 wherein said pre-processor is operable to generate said codebook adaptation using incremental updates.

5. The speech processing system of claim 1 wherein said pre-processor is operable to generate said codebook adaptation using a Generalized Lloyd algorithm, said Generalized Lloyd algorithm including an initial codebook.

6. The speech processing system of claim 5 wherein said initial codebook is said reference vector quantization codebook.

7. The speech processing system of claim 1 wherein said codebook generator is operable to adapt said reference vector quantization codebook to generate said at least one secondary vector quantization codebook.

8. The speech processing system of claim 1 wherein said preprocessor includes a compensation module for generating said compensated feature vector, $\hat{x}(n)$ in accordance with the equation $$\hat{x}(n) = x(n) + \sum_h Ph \sum_k p_k^h(n)[x_k^{ref} - x_k^h(n)]$$

where probability $p_k^h(n)$ is the probability that the n-th frame belongs to Voronoi region k in codebook h.

9. The speech processing system of claim 8 wherein said preprocessor includes a computation module operable to generate said probability $p_k^h(n)$ in accordance with the equation $$P_k^h(n) = \frac{e^{-\beta(x_k^h(n)-x(n))^2}}{\sum_h e^{-\beta(x_k^h(n)-x(n))^2}}$$

where probability $Ph$ is the probability that the utterance belongs to environment h.

10. The speech processing system of claim 9 wherein said computation module is further operable to generate said probability $Ph$ in accordance with the equation $$Ph = \frac{e^{-\alpha(x_k^h(n)-x(n))^2}}{\sum_h e^{-\alpha(x_k^h(n)-x(n))^2}}$$

where $$\hat{x}^h(n) = x_{k_0^h(n)}, k_0^h(n) = \arg \min_k (x_k^h - x(n))^2.$$

11. The speech processing system of claim 8 wherein said pre-processor further includes an update codebooks module.

12. The speech processing system of claim 11 wherein said update codebooks module is operable to dynamically adapt said secondary vector quantization codebooks in accordance with the equation $$x_k^h(n) = x_k^h(n-1) + \mu_k^h(n)[x(n) - x_k^h(n-1)]$$

where $$\mu_k^h(n) = \gamma(n) Ph p_k^h(n)$$

and where $\gamma(n) \sim 1/n$.

13. A method for processing speech collected from an unknown environment comprising the steps of:
    generating a reference vector quantization codebook describing speech collected from a reference environment;
    training speech models included in a speech recognizer using said reference vector quantization codebook;
    generating at least one secondary vector quantization codebook describing speech collected from at least one known secondary environment using said reference vector quantization codebook;
    generating a codebook adaptation using said at least one secondary vector quantization codebook;
    generating speech feature vectors describing the speech collected from the unknown environment;
    transforming said speech feature vectors using said reference vector quantization codebook and said codebook adaptation to generate compensated speech feature vectors; and
    providing said compensated speech feature vectors as input to said speech recognizer for further processing.

* * * * *